Patented June 12, 1951

2,556,315

UNITED STATES PATENT OFFICE 2,556,315

PRODUCTION OF A SALT OF P-CHLORO-PHENYL CYANAMIDE AND ISOPROPYL-GUANIDINE

Leonce Edouard Bessot, Paris, and Pierre Garet, Choisy-Le-Roe, France, assignors to Societe Des Usines Chimiques Rhone-Poulenc, Paris, France, a French body corporate No Drawing. Application February 14, 1949, Serial No. 76,422. In France February 20, 1948

5 Claims. (Cl. 260—551)

This invention relates to the production of new guanidine salts and especially, though not exclusively, to the production of the salt formed by the interaction of p-chlorophenyl cyanamide and isopropyl guanidine.

According to the present invention, a substituted cyanamide is reacted with a substituted guanidine at moderate temperature. In a preferred embodiment of the present invention, a p-chlorophenyl cyanamide and isopropyl-guanidine or a salt thereof are reacted together in an aqueous medium at a temperature of not more than about 35° C. when a salt constituting a valuable intermediate product for the preparation of technical and pharmaceutical products is obtained in excellent yield.

In the preferred form of this invention, molecularly equivalent quantities of p-chlorophenyl cyanamide and of isopropyl guanidine or a salt thereof are reacted together in aqueous medium, the temperature of the reaction being prevented from exceeding about 35° C. Where a salt of the guanidine compound is employed, the reaction should be conducted in the presence of the stoichiometric quantity of a caustic alkali. Especially suitable isopropyl guanidine salts are the sulphate, the hydrochloride and the nitrate. The reagents may be introduced into the reaction medium in any order.

The separation from the reaction medium of the p-chlorophenyl cyanamide salt of isopropyl guanidine does not present any difficulty, it having been found that this salt is practically insoluble in saturated solutions of alkali metal salts. Thus if a guanidine salt and caustic alkali are used and the proportions of the reagents and of water are initially so selected that, after the reaction, the alkali metal salt produced forms a saturated solution in the water of the medium at the temperature of the mixture, the mixture separates into two phases, one containing the p-chlorophenyl cyanamide salt of isopropyl guanidine and the other the saturated solution of the alkali metal salt. The p-chlorophenylcyanamide-isopropyl guanidine salt layer generally has a syrupy consistency and when decanted it soon crystallises. In all other cases the medium may be brought into the form of a mixture of the p-chlorophenyl cyanamide-isopropyl guanidine salt and of a saturated solution of alkali salt by adding either alkali salt or water to the medium, or by adjusting the temperature, or by a combination of these two processes. The foregoing methods of separation which rely on the insolubility of the p-chlorophenyl cyanamide salt of isopropyl guanidine in saturated solutions of alkali metal salts are very much preferred by reason of the simplicity of the methods and the excellence of the yields obtained but, of course, any of the known methods of separating a required product from reaction mixture, such as solvent extraction, filtration or selective or fractional dissolution, may be employed.

The crude p-chlorophenyl cyanamide-isopropyl guanidine salt thus separated can be purified by recrystallisation. The purified product consists of white crystals which are stable at room temperature and melt at 107.5° C. on the Maquenne block (instantaneous melting point, with partial decomposition). The new salt is insoluble in benzene, toluene and anisole, but is readily soluble in water at a temperature of not less than 5° C., being miscible in all proportions at 30° C. It isomerises on heating, at a rate increasing with the temperature, to form $N^1$-p-chlorophenyl-$N^5$-isopropyl-biguanide which is a valuable antimalarial drug.

As already indicated, the process of the present invention is applicable not only to the preparation of the p-chlorophenyl cyanamide salt of isopropyl guanidine, but also to the preparation of other salts of variously substituted cyanamides and guanidines.

The invention is illustrated by the following examples:

Example I

In a vessel provided with an agitator and maintained at 35° C., 150 g. of isopropyl guanidine sulphate are caused to react with 98 cc. of caustic soda (36° Bé.) for 30 minutes. A paste composed of 164 g. of p-chlorophenyl cyanamide of 93.4% purity and 142 g. of water is then rapidly added. Further quantities of p-chlorophenyl cyanamide are then added to the reaction mixture until a sample of the reaction mixture, diluted with 20 times its weight of distilled water is neutral to thymolphthalein.

The reaction mixture separates into two layers. The lower layer is a saturated solution of sodium sulphate which contains only very small quantities of the cyanamide-guanidine salt obtained. This layer is decanted.

The upper layer, consisting of the crude salt, is left to crystallise for at least 24 hours. By extraction of the occluded liquid from the crystallised product, a little more solution of sodium sulphate carrying traces of salt is separated. In all, 240 g. of crystals of the p-chlorophenyl cyanamide salt of isopropyl guanidine are obtained, which contain about 95% of the pure salt, 3% of water and 1.5% of sodium sulphate.

For purification, 100 g. of this crude product are dissolved in 100 cc. of water at 35° C. 3 g. of decolourising carbon are added and the solution is filtered and crystallised with agitation and cooling to 5° C. In this way, 100 g. of moist product are obtained, yielding 90 g. of pure product after drying at 20° C. in a current of air.

Example II

The reaction is carried out as in Example I. After adjustment to neutrality, 360 cc. of water are added, this being the quantity required in order to produce at 15° C. a saturated solution of the sodium sulphate in the water contained in the reaction medium. The reaction mixture is cooled at 15° C. with agitation.

The salt crystallises in small grains from which the moisture can be very readily extracted. It is filtered off, the moisture is extracted and the product is dried in a current of cold air. 242 g. of dry crude salt containing 1% sodium sulphate are thus obtained.

Example III 7.5 parts by weight of sodium are dissolved in 95 parts by weight of anhydrous methyl alcohol. There is then added in succession, at a temperature of about 22° C., 49 parts by weight of dry isopropyl guanidine sulphate and 50 parts by weight of dry p-chlorophenyl cyanamide. The resulting precipitate of sodium sulphate is separated by centrifuging and is washed with anhydrous methyl alcohol. The wash liquors are added to the reaction mixture and the whole is concentrated in vacuo at a temperature below 35° C. There is thus obtained 77 parts by weight of crude product melting at 98° C. which is recrystallised from iced water, giving a yield of 88% of that theoretically possible of the p-chlorophenyl cyanamide salt of isopropyl guanidine.

We claim:

1. A process for the production of the p-chlorophenyl cyanamide salt of isopropyl guanidine which comprises dissolving in a common solvent p-chlorophenyl cyanamide and isopropyl guanidine at a temperature not greater than about 35° C. in an aqueous medium which contains an alkali metal salt of an inorganic acid and, with the proportion of alkali metal salt and water at a given temperature of the reaction mixture such that the alkali salt is present in the form of a saturated solution, and separating the p-chlorophenyl cyanamide salt of isopropyl guanidine from the reaction mixture at that temperature.

2. A process for the production of the p-chlorophenyl cyanamide salt of isopropyl guanidine which comprises reacting substantially equimolecular proportions of p-chlorophenyl cyanamide and isopropyl guanidine at a temperature between 0° C. and 35° C. in an aqueous medium, saturating said aqueous medium with an alkali metal salt of an inorganic acid and separating the p-chlorophenyl cyanamide salt of isopropyl guanidine from the reaction mixture.

3. A process for the production of the p-chlorophenyl cyanamide salt of isopropyl guanidine which comprises dissolving in a common solvent p-chlorophenyl cyanamide and a water-soluble inorganic acid salt of isopropyl guanidine in an aqueous medium at a temperature between 0° C. and 35° C. and in the presence of a quantity of caustic alkali stoichiometrically equivalent to the said water-soluble salt, and separating the p-chlorophenyl cyanamide salt of isopropyl guanidine thus formed from the reaction mixture.

4. A process for the production of the p-chlorophenyl cyanamide salt of isopropyl guanidine which comprises reacting substantially equimolecular proportions of p-chlorophenyl cyanamide and a water-soluble inorganic acid salt of isopropyl guanidine in an aqueous medium at a temperature between 0° and 35° C. and in the presence of a quantity of caustic alkali stoichiometrically equivalent to the said water-soluble salt, and separating the p-chlorophenyl cyanamide salt of isopropyl guanidine thus formed from the reaction mixture.

5. A process for the production of the p-chlorophenyl cyanamide salt of isopropyl guanidine which comprises reacting together at a temperature between 0° C. and 35° C. substantially equimolecular proportions of p-chlorophenyl cyanamide and a water-soluble inorganic acid salt of iso-propyl guanidine, in the presence of a quantity of caustic alkali stoichiometrically equivalent to the said water-soluble salt, and in the presence of a quantity of water such that at a given temperature between 0° and 35° C. the alkali salt formed in the reaction forms a saturated solution in the said water and bringing the reaction mixture to the said given temperature thus causing the said p-chlorophenyl cyanamide salt of isopropyl guanidine to separate from the reaction mixture.

LEONCE EDOUARD BESSOT.
PIERRE GARET.

REFERENCES CITED

The following references are of record in the file of this patent:

FOREIGN PATENTS

| Number | Country | Date |
| --- | --- | --- |
| 62,539 | Argentina | Dec. 27, 1947 |
| 607,720 | Great Britain | Sept. 3, 1948 |

OTHER REFERENCES

Rathke, "Ber. Deut. Chem.," vol. 23, p. 1673 (1890).

Schotte et al., Hoppe Zeylers "Zeit. Physiol. Chem.," vol. 174, pp. 174 to 176 (1928).

Schlotta et al., "Ber. Deut. Chem.," vol. 62 (1929), pp. 1392 and 1395.